(12) United States Patent
Hamilton

(10) Patent No.: US 8,918,236 B2
(45) Date of Patent: Dec. 23, 2014

(54) METHODS AND SYSTEMS FOR ADJUSTING ATTITUDE USING REACTION WHEELS

(75) Inventor: Brian Hamilton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 873 days.

(21) Appl. No.: 13/168,700

(22) Filed: Jun. 24, 2011

(65) Prior Publication Data

US 2012/0325970 A1 Dec. 27, 2012

(51) Int. Cl.
| | |
|---|---|
| B64G 1/36 | (2006.01) |
| G05D 1/00 | (2006.01) |
| G05D 3/00 | (2006.01) |
| G06F 7/00 | (2006.01) |
| G06F 17/00 | (2006.01) |
| H02P 6/06 | (2006.01) |
| B64G 1/28 | (2006.01) |
| G05D 1/08 | (2006.01) |

(52) U.S. Cl.
CPC ...... *B64G 1/283* (2013.01); *H02P 6/06* (2013.01); *G05D 1/0883* (2013.01)
USPC .......................................................... 701/13

(58) Field of Classification Search
CPC .................................................... B64G 1/283
See application file for complete search history.

(56) References Cited

U.S. PATENT DOCUMENTS

| | | | |
|---|---|---|---|
| 3,968,352 A | 7/1976 | Andeen | |
| 4,123,779 A | 10/1978 | Goldschmidt | |
| 4,193,020 A | 3/1980 | Song | |
| 4,501,155 A * | 2/1985 | Garritano | 73/847 |
| 4,564,794 A | 1/1986 | Kilen et al. | |
| 4,644,749 A | 2/1987 | Somes | |
| 5,020,745 A | 6/1991 | Stetson, Jr. | |
| 5,201,833 A * | 4/1993 | Goodzeit et al. | 244/165 |
| 5,248,118 A | 9/1993 | Cohen et al. | |
| 5,582,368 A * | 12/1996 | Stetson, Jr. | 244/165 |
| 5,742,144 A * | 4/1998 | Kato et al. | 318/630 |
| 5,935,176 A * | 8/1999 | Nielson | 701/4 |
| 5,949,675 A | 9/1999 | Holmes et al. | |
| 6,517,029 B1 | 2/2003 | Holmes | |

OTHER PUBLICATIONS

European Patent Office, European Extended Search Report for Application No. 12 172 636.8 dated Oct. 1, 2012.

* cited by examiner

*Primary Examiner* — Helal A Algahaim
*Assistant Examiner* — Kelly E Darby
(74) *Attorney, Agent, or Firm* — Ingrassia Fisher & Lorenz, P.C.

(57) ABSTRACT

Methods and systems are provided for controlling attitude of a vehicle using a reaction wheel onboard the vehicle. One exemplary method involves receiving a torque command for adjusting the attitude of the vehicle using the reaction wheel, determining a phase error of the reaction wheel based at least in part on the torque command, and determining a motor torque command for the reaction wheel based on the phase error. The motor torque command is provided to an electric motor of the reaction wheel to apply a corresponding torque to the rotor of the reaction wheel. The relationship between the magnitude of the motor torque command and the magnitude of the phase error is nonlinear. In exemplary embodiments, the magnitude of the motor torque command exceeds the stiction torque, at least instantaneously, when the reaction wheel has fallen behind an expected position by more than a threshold amount.

19 Claims, 5 Drawing Sheets

METHODS AND SYSTEMS FOR ADJUSTING ATTITUDE USING REACTION WHEELS

TECHNICAL FIELD

The subject matter described herein relates generally to spacecraft attitude control systems, and more particularly, embodiments of the subject matter relate to methods and systems for operating one or more reaction wheels to adjust attitude in a manner that compensates for friction.

BACKGROUND

Reaction wheels are commonly used to control the attitude (or orientation) of a spacecraft, satellite, or the like. A reaction wheel typically consists of a rotor (or wheel) and an electric motor, wherein the electric motor is operated to apply torque to increase or decrease the angular velocity of the rotor, and thereby alter the angular momentum of the rotor. This change in angular momentum produces a reactionary torque which causes the spacecraft to rotate to the desired attitude or orientation. Attitude control systems (ACSs) and other spacecraft orienting applications often utilize a momentum control system (MCS) that includes at least three reaction wheels to provide rotation about three-different axes.

The bearings of reaction wheels exhibit friction, which impair operation of reaction wheels at low speeds or when a reaction wheel changes its direction of rotation. For example, when the rotor changes its direction of rotation, forces caused by static friction increase the amount of torque required to cause the rotor to resume rotating in the desired direction. Closed-loop control systems have been developed to mitigate the friction in reaction wheel bearings. However, due to non-linearities of the frictional forces in the bearings, existing control systems fail to adequately compensate for frictional forces within a desired amount of time, resulting in attitude errors.

BRIEF SUMMARY

An exemplary method is provided for controlling attitude of a vehicle using a reaction wheel onboard the vehicle. The method involves receiving a torque command for adjusting the attitude of the vehicle using the reaction wheel, determining a phase error of the reaction wheel based at least in part on the torque command, determining a motor torque command for the reaction wheel based on the phase error, and providing the motor torque command to the reaction wheel.

In another embodiment, a control system for a vehicle is provided. The control system includes a reaction wheel onboard the vehicle that includes a rotor coupled to an electric motor. A rotation sensing element is coupled to the rotor and generates an output indicative of rotation of the rotor. A control module is coupled to the electric motor and the rotation sensing element to determine a phase error of the rotor based on the output of the rotation sensing element and a torque command for the reaction wheel, determine a motor torque command based on the phase error, and provide the motor torque command to the electric motor. The electric motor applies torque corresponding to the motor torque command to the rotor to adjust the attitude of the vehicle.

Another exemplary method for controlling attitude of a vehicle using a reaction wheel onboard the vehicle involves determining a phase error of the reaction wheel based at least in part on a torque command for the reaction wheel, determining a stiction-overcoming motor torque command for the electric motor when the phase error is indicative of the rotor of the reaction wheel being behind an expected rotor position by more than a threshold amount, and providing the stiction-overcoming motor torque command to the electric motor. The electric motor applies torque corresponding to the stiction-overcoming motor torque command to the rotor. In an exemplary embodiment, the torque applied by the electric motor has an instantaneous magnitude greater than a stiction torque for the reaction wheel.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
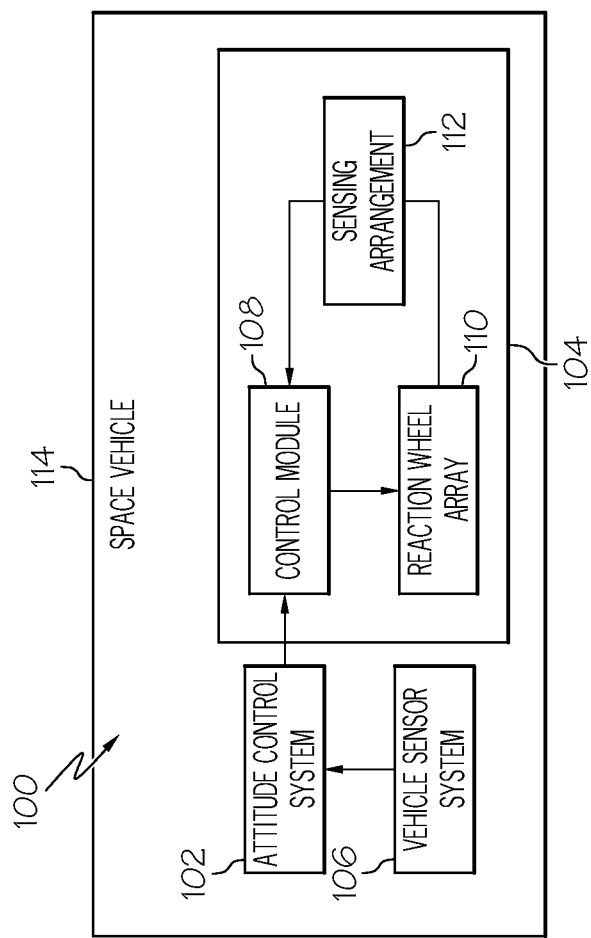
FIG. 1 is a block diagram of a control system suitable for use with a space vehicle in accordance with one embodiment.

The following detailed description is merely exemplary in nature and is not intended to limit embodiments of the subject matter or the application and uses of such embodiments. Any implementation described herein as exemplary is not necessarily to be construed as preferred or advantageous over other implementations. Furthermore, there is no intention to be bound by any theory presented in the preceding background or the following detailed description.

Embodiments of the subject matter described herein generally relate to methods and systems for operating reaction wheels to produce a desired attitude of a space vehicle (or spacecraft) in a manner that mitigates or otherwise compensates for the effects of friction in the bearings of the reaction wheels. As used herein, "breakaway torque","stiction torque", and any variants thereof should be understood as referring to the amount of torque required to overcome forces caused by static friction (or stiction) in the bearings of a reaction wheel when the rotor of the reaction wheel is not rotating (or stopped). "Running torque", "running drag torque", "kinetic friction torque" and variants thereof should be understood as referring to the amount of oppositional torque resulting from Coulomb friction forces in the bearings of the reaction wheel while the rotor is rotating.

As described in greater detail below, when the magnitude of the rotational speed of a reaction wheel is below a threshold rotational speed, modified motor torque commands are used to operate the reaction wheel in lieu of motor torque commands that are only responsive to speed error. The modified motor torque commands are determined based on a phase error that represents an angular displacement between an expected rotor position and a measured rotor position. When the phase error is indicative of the measured rotor position being behind the expected rotor position by a threshold amount, the modified motor torque command is a pulse with magnitude chosen to exceed the likely maximum amount of breakaway torque capable of being caused by friction force in the bearings to accelerate the rotation of the rotor and reduce the angular displacement between the expected rotor position and the measured rotor position. Conversely, when the phase error is indicative of the rotor being ahead of the expected rotor position by the threshold amount, the magnitude of the modified motor torque command is chosen to be less than the minimum expected amount of running drag torque being caused by friction force in the bearings to decelerate the rotation of the rotor and reduce the angular displacement between the expected rotor position and the measured rotor position. When the phase error is indicative of the rotor being in phase lock with the expected rotor position, the magnitude of the modified motor torque command is chosen to be greater than the maximum expected amount of running drag torque being caused by friction force in the bearings to maintain the rotor in phase lock with or ahead of the expected rotor position.

FIG. 1 depicts an exemplary embodiment of a control system 100 suitable for use with a space vehicle 114, such as a satellite or other spacecraft. In an exemplary embodiment, the control system 100 includes, without limitation, an attitude control system (ACS) 102, a momentum control system (MCS) 104, and a vehicle sensor system 106. During operation of control system 100, the ACS 102 provides torque commands for adjusting the attitude or otherwise reorienting the space vehicle 114 to a control module 108 of the MCS 104, which, in turn, determines appropriate motor torque commands for operating a reaction wheel array 110 in a manner that is influenced by the torque commands provided by the ACS 102 and operates the reaction wheel array 110 to provide the commanded reactionary torque on the space vehicle 114 to reorient or otherwise adjust the attitude of the space vehicle 114 in the desired manner.

In an exemplary embodiment, the reaction wheel array 110 includes a plurality of reaction wheels mounted to the space vehicle 114, wherein each reaction wheel includes a rotating element (or rotor or wheel) mechanically coupled to or otherwise driven by an electric motor. Rotation of the rotor about its axis of rotation produces an angular momentum aligned with the axis of rotation, and the electric motor is operated to apply torque to the rotor to increase and/or decrease the angular velocity of the rotor, and thereby increase and/or decrease the angular momentum of the reaction wheel. Changing the angular momentum of one or more reaction wheels results in a reactionary torque opposing the change in angular momentum that is applied to the vehicle 114, based on the conservation of angular momentum principles, as will be appreciated in the art. The reaction wheels of the array 110 are arranged such that the reaction wheel array 110 is capable of imparting rotational torque on the vehicle 114 three-dimensionally (i.e., about three different orthogonal axes).

Each reaction wheel of the array 110 is mounted to the space vehicle 114 via one or more bearings. As described in greater detail below, the force attributable to friction in or otherwise exhibited by the bearings used to mount a reaction wheel of the array 110 to the space vehicle 114 produces a torque that opposes rotation of the rotor to decrease the angular momentum of that reaction wheel, which, in turn, may decrease the amount of reactionary torque applied to the space vehicle 114 and/or result in vehicle attitude errors. Thus, in an exemplary embodiment, the MCS 104 determines motor torque commands for operating the electric motors of the reaction wheels of the array 110 in a manner that accounts for the friction in the reaction wheel bearings to accurately reduce attitude errors. As described in greater detail below, at low rotational speeds, the MCS 104 determines phase-locked loop based motor torque commands to apply torque to that respective reaction wheel that is nonlinearly related to the phase error of the rotor of that reaction wheel to maintain the rotor in phase lock with an expected rotor position and reduce the amount of time during which the rotor rotation is unintentionally stopped due to bearing friction.

In an exemplary embodiment, the MCS 104 includes a sensing arrangement 112 that is coupled to the reaction wheel array 110 and the control module 108. The sensing arrangement 112 is configured to provide information about the operation of individual reaction wheels of the reaction wheel array 110 to the control module 108. In an exemplary embodiment, the sensing arrangement 112 includes a plurality of rotation sensing elements, wherein each rotation sensing element is coupled to a respective reaction wheel of the reaction wheel array 110 and generates an output indicative of the rotational displacement and/or rotational speed of the rotor of its associated reaction wheel. In an exemplary embodiment, the sensing arrangement 112 includes a plurality of tachometers (or another suitable rotational speed sensing element), with each respective tachometer being mechanically coupled to a rotor of a respective reaction wheel of the reaction wheel array 110. As described in greater detail below, in an exemplary embodiment, each tachometer produces or otherwise generates an output pulse every time its associated rotor rotates by a certain incremental angular displacement (also referred to herein as a tachometer rotational increment or rotational increment). For example, in accordance with one exemplary embodiment, the tachometers of the sensing arrangement 112 generate eighteen output pulses per revolution or one output pulse every $2\pi/18$ radians of rotation. Thus, the output pulses generated by the tachometers of the sensing arrangement 112 are indicative of the angular displacement of the rotors of the reaction wheels, wherein the frequency or rate of the output pulses generated by the tachometers is indicative of the rotational speed of the reaction wheel rotors.

In the illustrated embodiment, the vehicle sensor system 106 generally represents one or more sensing elements (or sensors) onboard the vehicle 114 that are configured to sense, measure, or otherwise obtain information regarding the current attitude (or orientation) and rotational velocity (or angular velocity or rotational rate) of the space vehicle 114. In certain deployments, the vehicle sensor system 106 uses sensors or sensing elements such as, without limitation: rate gyroscopes, ring laser gyros, fiber optic gyros, star trackers and sun sensors. In an exemplary embodiment, the ACS 102 is communicatively coupled to the vehicle sensor system 106, and the ACS 102 determines a vehicle torque command for slewing, reorienting, or otherwise adjusting the attitude of the space vehicle 114 based at least in part on the attitude and rotational velocity information received from the vehicle sensor system 106. Depending on the embodiment, the ACS 102 may determine the vehicle torque command automatically based on the current attitude and/or rotational velocity of the space vehicle 114 or in response to an input from a user. During operation of control system 100, the MCS 104 communicates with the ACS 102, and in response to receiving a vehicle torque command from the ACS 102, the MCS 104 operates one or more reaction wheels of the reaction wheel array 110 to apply the commanded torque to the space vehicle 114 and thereby adjust the attitude of the space vehicle 114 commanding the desired manner.

In an exemplary embodiment, the control module 108 generally represents the hardware, software, firmware, processing logic, and/or other components of the MCS 104 configured to support operation of the reaction wheel array 110 in response to a vehicle torque command from the ACS 102. Depending on the embodiment, the control module 108 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. In practice, control module 108 includes processing logic that may be configured to carry out the functions, techniques, and processing tasks associated with the operation of the space vehicle 114, as described in greater detail below. Furthermore, the steps of a method or algorithm described in connection with the embodiments disclosed herein may be embodied directly in hardware, in firmware, in a software module executed by control module 108, or in any practical combination thereof. The control module 108 may also include a suitable amount of memory to support the operations of the control module 108 described herein.

In accordance with one or more embodiments, in response to receiving a vehicle torque command from the ACS 102, the control module 108 calculates or otherwise determines an appropriate reaction wheel torque command for each respective reaction wheel of the reaction wheel array 110 to provide the commanded torque to the vehicle 114. For example, for each reaction wheel of the reaction wheel array 110, the control module 108 may determine a reaction wheel torque command based on the vehicle torque command by determining the component of the vehicle torque command that is aligned with the axis of rotation of that respective reaction wheel. In other embodiments, the ACS 102 may determine reaction wheel torque commands based on the vehicle torque commands and provide reaction wheel torque commands to the control module 108 in lieu of providing a vehicle torque command. Various control schemes and/or algorithms for determining reaction wheel torque commands are well known and will vary depending on the particular embodiment and configuration of reaction wheels of the reaction wheel array 110, and therefore, the specific methods for determining torque commands for the individual reaction wheels of the reaction wheel array 110 will not be described in detail herein.

It should be understood that FIG. 1 is a simplified representation of a space vehicle 114 for purposes of explanation and ease of description, and FIG. 1 is not intended to limit the application or scope of the subject matter in any way. In this regard, although FIG. 1 depicts the ACS 102 onboard the space vehicle 114, in some embodiments, some components of the ACS 102 may be separate from the space vehicle 114 and remotely located (e.g., at a terrestrial location on the Earth) and communicatively coupled to the MCS 104 and vehicle sensor system 106 onboard the space vehicle 114, for example, via a wireless data link or another suitable wireless data communication medium. In practice, the space vehicle 114 may also include numerous other components for providing additional functions and features, as will be appreciated in the art.

Figure 2:
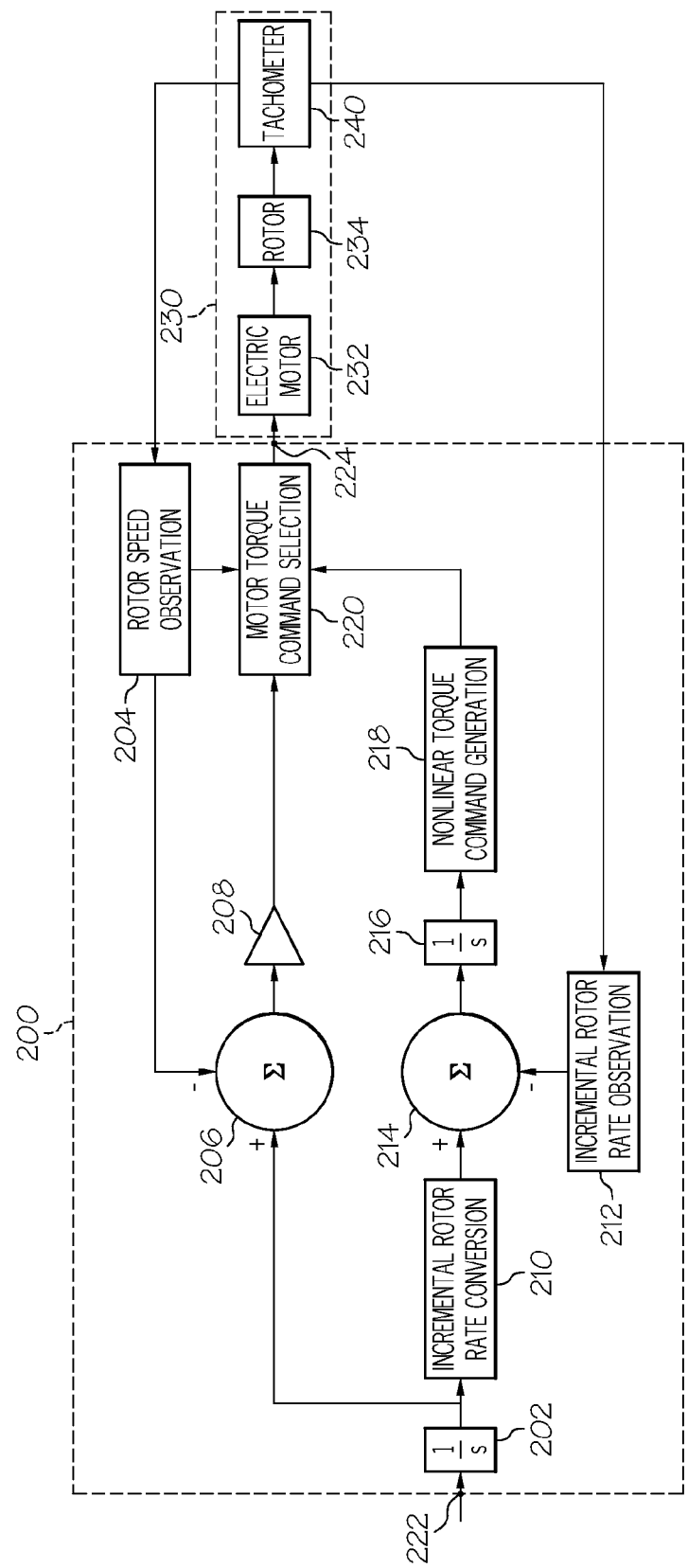
FIG. 2 is a block diagram of a reaction wheel control system suitable for use with a reaction wheel in the control system of FIG. 1 in accordance with one embodiment.

FIG. 2 depicts an exemplary embodiment of a reaction wheel control system 200 suitable for use with a reaction wheel assembly 230. In this regard, in an exemplary embodiment, the reaction wheel control system 200 is implemented by the control module 108 and/or MCS 104 in the control system 100 of FIG. 1 for each reaction wheel 230 of the reaction wheel array 110. The illustrated reaction wheel control system 200 includes, without limitation, a torque integration block 202, a rotor speed observation block 204, a summation block 206, a gain block 208, an incremental rotor rate conversion block 210, an incremental rotor rate observation block 212, a second summation block 214, a phase error integration block 216, a nonlinear motor torque command generation block 218, and a motor torque command selection arrangement 220. The motor torque commands at the output 224 of the reaction wheel control system 200 are provided to the electric motor 232 of the reaction wheel 230, wherein the electric motor 232 is responsive to the motor torque command and thereby operated to apply the corresponding torque to the rotor 234 of the reaction wheel 230. As described in greater detail below, when the magnitude of the rotational speed of the rotor 234 of the reaction wheel 230 is less than a threshold rotational speed, the reaction wheel control system 200 generates or otherwise provides modified motor torque commands determined by the nonlinear motor torque command generation block 218 at the output 224 that based on a phase error for the rotor 234 of the reaction wheel to reduce the amount of time during which the rotation of the rotor 234 is unintentionally stopped due to friction in its bearings. As described in greater detail below, the modified motor torque commands determined by the nonlinear motor torque command generation block 218 are not linearly related to the phase error. In this regard, the magnitudes of the modified motor torque commands are not proportional to the magnitude of the phase error.

In an exemplary embodiment, the input 222 of the reaction wheel control system 200 receives or otherwise obtains a reaction wheel torque command corresponding to the component of the vehicle torque command provided by the ACS 102 that is to be produced by the respective reaction wheel 230 of the reaction wheel array 110. In other words, the reaction wheel torque command at the input 222 corresponds to the component of the vehicle torque command aligned with the axis of rotation of the rotor 234 and is intended to result in the reaction wheel 230 being operated to produce a component of the desired reactionary torque to be imparted to the vehicle 114 by the reaction wheel array 110. As described above, in some embodiments, the MCS 104 and/or control module 108 may determine the reaction wheel torque command based on the vehicle torque command received from the ACS 102 and the geometric arrangement of the reaction wheel 230 with respect of the other reaction wheels of the reaction wheel array 110. As illustrated, the torque integration block 202 is coupled to the input 222 to receive the reaction wheel torque command, and the torque integration block 202 has a transfer function configured to convert the reaction wheel torque command to obtain an expected (or desired) angular velocity (e.g., in radians per second) for the rotor 234 of the reaction wheel 230 that corresponds to the reaction wheel torque command. In other words, the output of the torque integration block 202 corresponds to the angular velocity of the rotor 234 of the reaction wheel 230 that would be expected if the reaction wheel 230 were producing the commanded reaction wheel torque provided at the input 222.

As illustrated, the output of the torque integration block 202 is coupled to a first input of the summation block 206, which is configured to determine the difference between the expected angular velocity of the rotor 234 and a measured (or observed) angular velocity of the rotor 234. In the illustrated embodiment, the rotor speed observation block 204 is coupled to the rotation sensing element 240 coupled to the rotor 234, wherein the rotor speed observation block 204 counts or otherwise monitors the number of output pulses generated by the rotation sensing element 240 over a control cycle (or another observation time interval) in a manner that accounts for the direction of rotation of the rotor 234 (e.g., one rotational direction is positive and the opposite direction is negative, with the count being increased when rotation is in the positive direction and decreased when rotation is in the negative direction), and determines the corresponding angular velocity of the rotor 234, which is provided to the input of the summation block 206. For example, in accordance with one embodiment the rotation sensing element 240 is realized as a tachometer configured to generate output pulses at rotational increments equal to $2\pi/18$ radians, the rotor speed observation block 204 counts the number of output pulses generated by the tachometer 240 during the preceding control cycle, multiplies the total number of output pulses by $2\pi/18$ radians, and divides the result by the duration of the control cycle to determine the measured (or observed) angular velocity of the rotor 234 in radians per second. In this manner, the angular velocity provided by the rotor speed observation block 204 is measured, sensed or otherwise obtained using the tachometer 240. The measured angular velocity determined by the rotor speed observation block 204 is provided to a second input of the summation block 206, wherein the output of the summation block 206 represents the velocity error of the rotor 234, that is, the difference between the expected angular velocity of the rotor 234 and the measured angular velocity of the rotor 234, which is amplified by the gain block 208 to obtain a closed-loop motor torque command for operating the electric motor 232. The output of the gain block 208 is coupled to an input of the motor torque command selection arrangement 220.

In an exemplary embodiment, the motor torque command selection arrangement 220 is configured to obtain or otherwise receive the measured angular velocity of the rotor 234 from the rotor speed observation block 204, and when the motor torque command selection arrangement 220 determines that the magnitude of the measured angular velocity of the rotor 234 is above a threshold rotational speed (e.g., 0.5 radians per second), the motor torque command selection arrangement 220 provides the closed-loop motor torque command from the gain block 208 to the output 224, as described in greater detail below. As described above, the motor torque commands provided by the motor torque command selection arrangement 220 to the output 224 are provided to the electric motor 232 of the reaction wheel 230. The electric motor 232 is mechanically coupled to the rotor 234 (e.g., via a shaft or another drive train element) and generates, produces, or otherwise applies a torque to the rotor 234 of the reaction wheel 230 having a magnitude and direction corresponding to the motor torque command provided by the reaction wheel control system 200 at the output 224. In an exemplary embodiment, the transfer function and/or gain of the gain block 208 is chosen such that the closed-loop motor torque command generated by the closed-loop control system implemented by the arrangement of the torque integration block 202, the rotor speed observation block 204, the summation block 206, and the gain block 208 operates the electric motor 232 to increase and/or decrease the angular velocity of the rotor 234 to be substantially equal to the expected angular velocity at the output of the torque integration block 202 to maintain the rotor velocity error at the output of the summation block 206 at a minimum.

In the illustrated embodiment of FIG. 2, the output of the torque integration block 202 is also coupled to the input of the incremental rotor rate conversion block 210, wherein the incremental rotor rate conversion block 210 receives the expected angular velocity for the rotor 234 from the torque integration block 202 and converts that angular velocity into an expected (or desired) incremental rotational rate for the rotor 234 corresponding to the reaction wheel torque command. In this regard, the expected incremental rotational rate represents the rate (or frequency) of output pulses that would be expected to be generated by the tachometer 240 coupled to the rotor 234 of the reaction wheel 230 if the rotor 234 were rotating with the expected angular velocity to produce the commanded reaction wheel torque, that is, the number of rotational increments that would be observed by the tachometer 240 per unit of time at the expected angular velocity. Thus, the expected incremental rotational rate represents the expected rotational speed of the rotor 234 expressed in terms of rotational increments per time. For example, as described above, in accordance with one exemplary embodiment, the tachometer 240 generates eighteen output pulses per revolution, such that when the output of the torque integration block 202 is in radians per second, the incremental rotor rate conversion block 210 multiplies the expected angular velocity by the inverse of the tachometer rotational increment (e.g., $18/2\pi$ tachometer pulses per radians) to obtain the expected incremental rotational rate in tachometer output pulses per second.

The incremental rotor rate observation block 212 is coupled to or otherwise configured to receive the output pulses from the tachometer 240 associated with the reaction wheel 230, wherein the incremental rotor rate observation block 212 is configured to determine the measured (or observed) incremental rate of the rotor based on the number of output pulses generated by the tachometer 240. In this regard, the incremental rotor rate observation block 212 counts the output pulses generated by the tachometer 240 (in a manner that accounts for the direction of rotation as described above in the context of rotor speed observation block 204) and differentiates the tachometer pulses or otherwise divides the total number of tachometer output pulses by the duration of the control cycle (or other observation time interval) to obtain a measured (or observed) incremental rate for the rotor 234 of the reaction wheel 230 in tachometer pulses per second. Thus, the measured incremental rotational rate represents the measured rotational speed of the rotor 234 expressed in terms of rotational increments per time. As illustrated, the output of the incremental rotor rate conversion block 210 is coupled or otherwise provided to a first input of the summation block 214 and the output of the incremental rotor rate observation block 212 is coupled or otherwise provided to a second input of the summation block 214, wherein the summation block 214 is configured to subtract the measured incremental rotational rate determined by incremental rotor rate observation block 212 from the expected incremental rotational rate determined by incremental rotor rate conversion block 210 to obtain an incremental rate error. The output of the summation block 214 is coupled or otherwise provided to the input of the phase error integration block 216, wherein the phase error integration block 216 is configured to integrate the incremental rate error to obtain a phase error ($p_{err}$) for the rotor 234 of the reaction wheel 230. In this regard, the phase error represents the difference between the expected (or desired) angular position of the rotor 234, determined based on the reaction wheel torque command provided at the input 222, and the measured (or observed) position of the rotor 234, determined based on the tachometer output pulses, expressed in terms of a number of tachometer output pulses (or tachometer rotational increments).

In an exemplary embodiment, the output of the phase error integration block 216 is coupled or otherwise provided to the input of the nonlinear motor torque command generation block 218 which generates a modified motor torque command at its output based on the phase error obtained from the phase error integration block 216. The modified motor torque command is provided to another input of the motor torque command selection arrangement 220. As described above, the motor torque command selection arrangement 220 receives the measured angular velocity of the rotor 234 from the rotor speed observation block 204, and in response to detecting or otherwise determining that the magnitude of the measured angular velocity of the rotor 234 is less than the threshold rotational speed (e.g., 0.5 radians per second), the motor torque command selection arrangement 220 provides the modified motor torque command to the output 224.

In an exemplary embodiment, the modified motor torque commands generated by the nonlinear motor torque command generation block 218 are nonlinearly related to the phase error from the phase error integration block 216 and attempt to maintain the rotor position in phase lock with the desired rotor position by accounting for the oppositional torque (e.g., the running drag torque) caused by frictional forces in the bearings of the reaction wheel 230. In an exemplary embodiment, the output of the tachometer 240 is discrete in nature (e.g., emitting a fixed number of pulses per revolution), and accordingly, in this context, phase lock is achieved by cycling between "ahead" and "behind" the ideal position. To obtain this "phase lock" condition, the torque generated by the electric motor 232 is greater than the running drag torque when the rotor position is behind the desired rotor position and is less than the running drag torque when the rotor position is ahead of the desired rotor position. The phase error produced by integrator 216 indicates how far ahead or behind the rotor is from phase lock with the desired rotor position, in units equivalent to the tachometer increment (e.g., a multiple of the angular displacement between tachometer output pulses). When the phase error is indicative of the rotor position being less than one tachometer increment behind the expected rotor position (e.g., $0 \leq p_{err} < 1$), the nonlinear motor torque command generation block 218 generates or otherwise provides a modified motor torque command at the input to the motor torque command selection arrangement 220 having a magnitude that is greater than the likely maximum running torque for the reaction wheel 230, alternatively referred to herein as an acceleration motor torque command. In this regard, when an acceleration motor torque command having a magnitude that is greater than the running torque is provided to the output 224 by the motor torque command selection arrangement 220, the electric motor 232 applies a torque to the rotor 234 that accelerates the rotation of the rotor 234 by virtue of its magnitude exceeding the oppositional torque caused by kinetic friction in the bearings. In this manner, the acceleration motor torque command reduces the phase error of the rotor 234. It should be noted that the frictional forces in the bearings vary over time, and in some embodiments, the nonlinear torque command generation block 218 may dynamically calculate the maximum running torque based on previously applied motor torque commands and previously obtained rotor speed and modify the magnitude of the acceleration motor torque command in a corresponding manner to reflect the current state of the reaction wheel bearings.

When the phase error is indicative of the rotor 234 of the reaction wheel 230 being ahead of the expected rotor position by less than one tachometer increment (e.g., $-1 < p_{err} < 0$), the nonlinear motor torque command generation block 218 generates or otherwise provides a modified motor torque command at the input of the motor torque command selection arrangement 220 having a magnitude that is less than the likely minimum running torque for the reaction wheel 230, alternatively referred to herein as a deceleration motor torque command. In this regard, when the electric motor 232 applies a torque to the rotor 234 which less than the running torque, the rotor 234 slows down or otherwise loses rotational velocity due to the running torque caused by friction in the bearings exceeding the torque applied by the electric motor 232. The deceleration motor torque command increases the likelihood of the rotor 234 returning to being in phase lock with the expected rotor position. In an exemplary embodiment, when the phase error is indicative of the rotor 234 of the reaction wheel 230 being ahead of the expected rotor position by less than one tachometer increment, the nonlinear motor torque command generation block 218 generates or otherwise provides a deceleration motor torque command having a magnitude that is equal to one half of the magnitude of the nominal running torque for the reaction wheel 230. In an exemplary embodiment, when the rotor phase error is indicative of the rotor 234 of the reaction wheel 230 being ahead of the expected rotor position by one or more tachometer increments (e.g., $p_{err} \leq -1$), the nonlinear motor torque command generation block 218 generates or otherwise provides a modified motor torque command at the input of the motor torque command selection arrangement 220 having a magnitude equal to zero to ensure the rotor 234 slows down due to the friction in the bearings.

Alternatively, when the phase error is indicative of the rotor 234 of the reaction wheel 230 being behind the expected rotor position by at least one tachometer increment but less than two tachometer increments (e.g., $1 \leq p_{err} < 2$), the nonlinear motor torque command generation block 218 generates or otherwise provides a modified motor torque command having a magnitude that exceeds the magnitude of the maximum torque likely to be caused by the static friction in the bearings of the reaction wheel 230, or in other words, a magnitude greater than the maximum breakaway torque. In one embodiment, the nonlinear motor torque command generation block 218 generates or otherwise provides at the output 224 a modified motor torque command consisting of a pre-stored waveform having an instantaneous peak value greater than the magnitude of the maximum torque likely to be caused by the static friction in the bearings of the reaction wheel 230. In this regard, when rotation of the rotor 234 is stopped (i.e., rotational speed equal to zero), the torque necessary to overcome static friction (or stiction) forces in the bearings may be much greater than the running torque attributable to kinetic friction in the bearings. For example, the magnitude of the torque attributable to stiction (e.g., the breakaway torque) may be as much as ten to fifty times the running torque. Thus, the modified motor torque command waveform provided by the block 218 when the rotor 234 is behind the expected rotor position has an instantaneous magnitude that exceeds the stiction torque, and accordingly, for ease of explanation, the modified motor torque command having an instantaneous magnitude that is greater than or equal to the magnitude of the maximum torque likely to be caused by the friction in the bearings is alternatively referred to herein as a stiction-overcoming motor torque command. As described in greater detail below in the context of FIG. 4, in an exemplary embodiment, the stiction-overcoming motor torque command increases from the value of the preceding motor torque command with substantially sinusoidal shape to a peak value greater than or equal to the stiction torque (e.g., the maximum torque likely to be caused by bearing friction) before decreasing with substantially sinusoidal shape and settling at a constant value that is greater than the running torque for the remainder of the control cycle. In this situation, when the electric motor 232 applies the stiction-overcoming torque to the rotor 234, any opposing torque attributable to frictional forces in the bearings of the reaction wheel 230 is likely to be overcome at least instantaneously. By overcoming the frictional forces in the reaction wheel bearings, the stiction-overcoming motor torque command may accelerate the rotor 234 or otherwise increase the rotational speed of the rotor 234 and thereby reduces the likelihood of the rotation of the rotor 234 being unintentionally stopped for an extended period of time. Preferably, the stiction-overcoming motor torque command returns the rotor 234 to being in phase lock with (or slightly ahead of) the expected rotor position by the next control cycle. As described in greater detail below, in an exemplary embodiment, once the nonlinear motor torque command generation block 218 generates the stiction-overcoming motor torque command, the nonlinear motor torque command generation block 218 is configured to wait for a first delay time interval before subsequently generating another stiction-overcoming motor torque command to allow for the possibility of the rotor 234 returning to being in phase lock with the expected rotor position with minimal overshoot.

In a similar manner, when the phase error is indicative of the rotor 234 of the reaction wheel 230 being behind the expected rotor position by at least two tachometer increments (e.g., $p_{err}>2$), the nonlinear motor torque command generation block 218 generates or otherwise provides one or more additional stiction-overcoming motor torque command waveforms that increase to an instantaneous peak value greater than or equal to the magnitude of the maximum torque likely to be caused by stiction forces in the reaction wheel bearings. In some embodiments, the magnitude of the second stiction-overcoming motor torque command may exceed the magnitude of the first stiction-overcoming motor torque command (e.g., when the rotor 234 is less than two tachometer increments ahead). In an exemplary embodiment, after the nonlinear motor torque command generation block 218 identifies a phase error of two or more tachometer increments behind the desired rotor position, the nonlinear motor torque command generation block 218 is configured to wait for a second delay time interval, which is less than the first delay time interval used with the first stiction-overcoming motor torque command (e.g., when the phase error is indicative of the rotor 234 being behind the desired rotor position by less than two tachometer increments), before subsequently generating another stiction-overcoming motor torque command. In this regard, the shorter delay time interval allows for the transfer of additional energy to the rotor 234 to reduce the amount of time the rotor 234 is unintentionally stopped.

Figure 3:
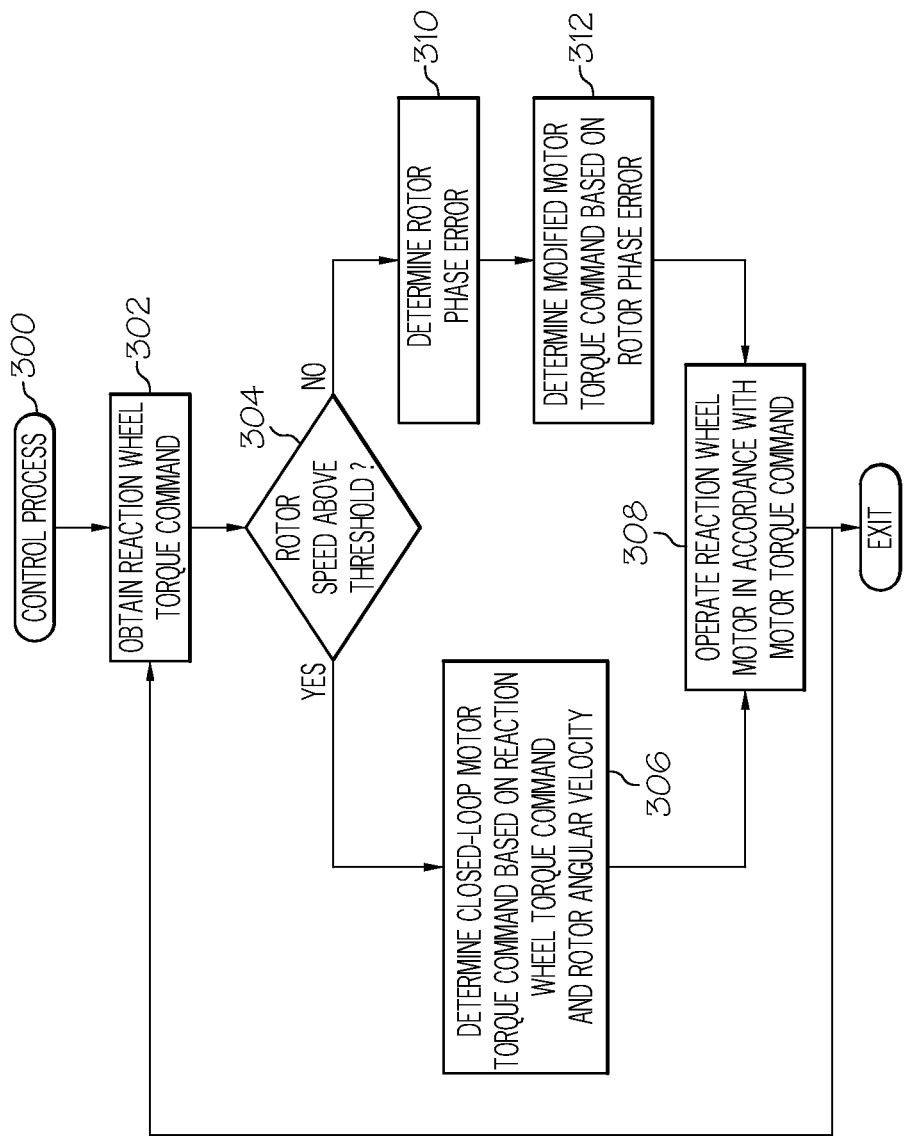
FIG. 3 is a flow diagram of a control process suitable for use in the control system of FIG. 1 in accordance with one embodiment.
Figure 4:
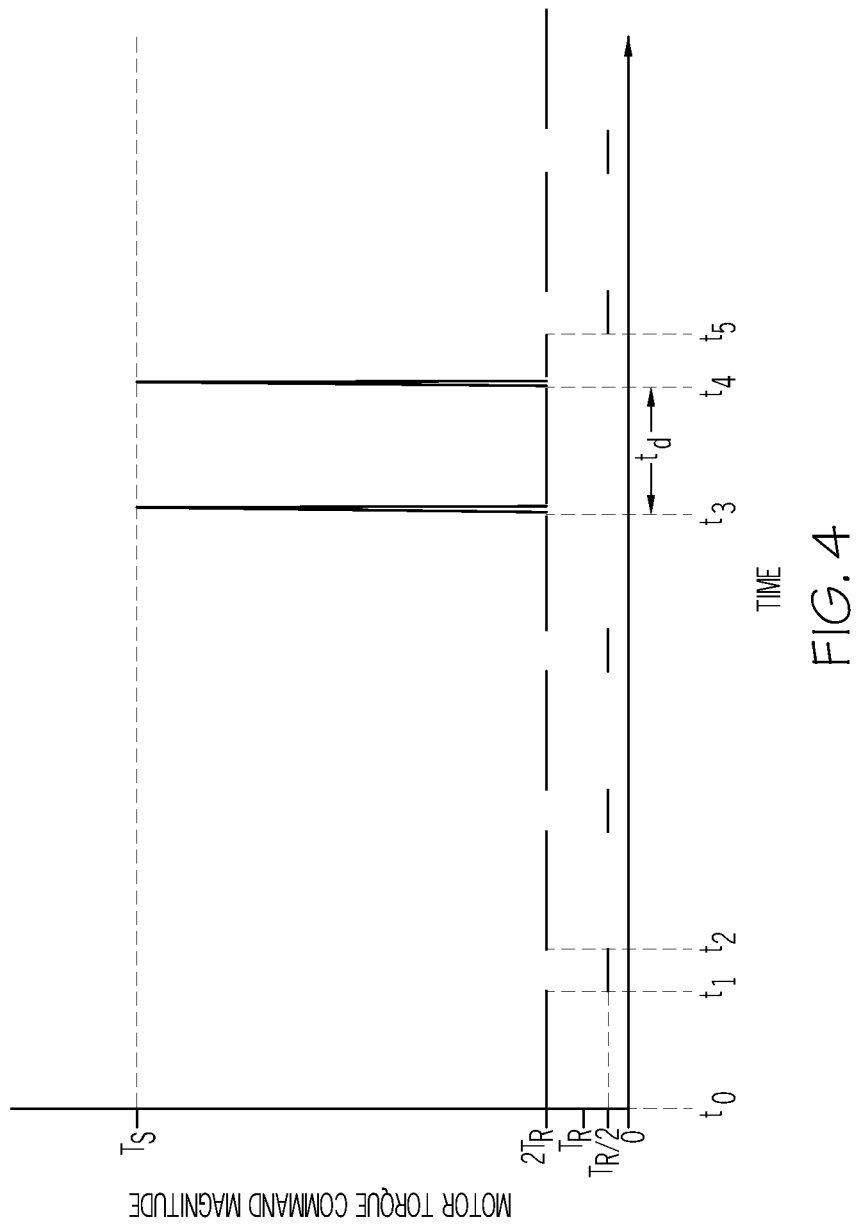
FIG. 4 is a graph illustrating the magnitude of modified motor torque commands with respect to time illustrating an implementation of the control process of FIG. 3 by the reaction wheel control system of FIG. 2 in accordance with one exemplary embodiment.

It should be understood that the description of the nonlinear motor torque command generation block 218 in the context of FIGS. 2-4 is not intended to limit the application or scope of the subject matter in any way. In practice, there are numerous possible configurations of deceleration motor torque commands, acceleration motor torque commands, and stiction-overcoming motor torque commands that may be implemented in an equivalent manner to achieve substantially the same functionality. In this regard, the exemplary deceleration motor torque commands, acceleration motor torque commands, and stiction-overcoming motor torque commands described herein are representative of merely one example embodiment for purposes of explanation.

Referring now to FIG. 3, in an exemplary embodiment, a control system may be configured to perform a control process 300 and additional tasks, functions, and operations described below. The various tasks may be performed by software, hardware, firmware, or any combination thereof. For illustrative purposes, the following description may refer to elements mentioned above in connection with FIGS. 1-2. In practice, the tasks, functions, and operations may be performed by different elements of the described system, such as the MCS 104, the control module 108, the reaction wheel array 110, the sensing arrangement 112, the reaction wheel control system 200, the reaction wheel 230, and/or the tachometer 240. It should be appreciated that any number of additional or alternative tasks may be included, and may be incorporated into a more comprehensive procedure or process having additional functionality not described in detail herein.

Referring to FIG. 3, and with continued reference to FIG. 1 and FIG. 2, the control process 300 is performed to determine motor torque commands for operating an electric motor of a reaction wheel. In this regard, in an exemplary embodiment, the control process 300 is performed concurrently for each individual reaction wheel 230 in the reaction wheel array 110 of the control system 100. The control process 300 begins by obtaining a torque command for the reaction wheel (e.g., a reaction wheel torque command) (task 302). As described above, the ACS 102 determines a vehicle torque command that corresponds to a desired amount of reactionary torque to be provided by the MCS 104 and/or reaction wheel array 110 to reorient or otherwise adjust the attitude of the space vehicle 114 to achieve a desired attitude and/or rotational velocity of the space vehicle 114. In one embodiment, the MCS 104 and/or control module 108 receives the vehicle torque command from the ACS 102, and in response, determines reaction wheel torque commands for the individual reaction wheels of the reaction wheel array 110 based on the vehicle torque command and the geometric arrangement of the reaction wheels of the reaction wheel array 110. In this regard, the MCS 104 and/or control module 108 to determine how the angular velocities of the individual reaction wheels should be increased and/or decreased to produce a component of the vehicle torque command. In other embodiments, the ACS 102 may determine reaction wheel torque commands based on the vehicle torque command in similar manner, and provide the reaction wheel torque commands to the MCS 104 and/or control module 108. As described above in the context of FIG. 2, the input 222 of the reaction wheel control system 200 obtains or otherwise receives the reaction wheel torque command that is utilized to determine the motor torque command for operating the electric motor 232 of the reaction wheel 230.

In an exemplary embodiment, the control process 300 continues by determining whether the rotational speed of the reaction wheel is above a threshold rotational speed value (task 304). The threshold rotational speed value represents a magnitude of the angular velocity of the reaction wheel rotor where rotation of the rotor is sufficiently unlikely to be stopped by frictional forces in the bearings of the reaction wheel within the next control cycle. In accordance with one or more embodiments, the threshold rotational speed value is 0.5 radians per second. When the rotational speed of the rotor of the reaction wheel is above the threshold value, the control process 300 continues by determining a closed-loop motor torque command for the reaction wheel and operating the electric motor of the reaction wheel in accordance with the closed-loop motor torque command (tasks 306, 308). As described above in the context of FIG. 2, in an exemplary embodiment, the reaction wheel control system 200 implemented by the MCS 104 and/or control module 108 includes a rotor speed observation block 204 coupled to the tachometer 240 associated with the reaction wheel 230, wherein the rotor speed observation block 204 determines the measured angular velocity of the rotor 234 and provides the rotor angular velocity to the motor torque command selection arrangement 220. When the magnitude of the rotor angular velocity is above the threshold rotational speed value (e.g., 0.5 radians per second), the motor torque command selection arrangement 220 provides closed-loop motor torque commands from the output of the gain block 208 to the electric motor 232 of the reaction wheel 230. As described above, the closed-loop motor torque commands are determined by integrating or otherwise converting the reaction wheel torque command to an expected rotor angular velocity (e.g., by the torque integration block 202), subtracting the measured rotor angular velocity from the expected rotor angular velocity (e.g., by summation block 206) to obtain the rotor velocity error, and amplifying the rotor velocity error (e.g., by the gain block 208). The closed-loop motor torque commands are provided to the electric motor 232 via the motor torque command selection arrangement 220, wherein the electric motor 232 applies torque to the rotor 234 corresponding to motor torque command at the output 224 to adjust the rotational velocity of the rotor 234 in a manner that reduces the rotor speed velocity error, and thereby, imparts the commanded torque component on the vehicle 114.

The loop defined by tasks 302, 304, 306 and 308 may repeat as desired throughout operation of the control system 100 until the rotational speed of the reaction wheel 230 falls below the threshold rotor speed value. It should be noted that the closed-loop motor torque commands are linearly related to the rotor velocity error and by virtue of the feedback loop compensate for kinetic friction in the bearings of the reaction wheel 230 to provide the desired torque to the space vehicle 114. In this regard, the gain and/or transfer function of the gain block 208 may be chosen to accurately provide the desired torque to the space vehicle 114 when the rotor 234 is rotating. However, as described above, the torque caused by stiction in the reaction wheel bearings may be substantially greater than the torque attributable to kinetic friction in the reaction wheel bearings. Thus, when the rotation of the rotor 234 is stopped at low rotational speeds and/or during changes of direction, it may take a number of control cycles for the rotor velocity error to increase to a large enough value that results in the magnitude of the closed-loop motor torque command at the output of the gain block 208 exceeding the stiction torque. As a result, at low rotational speeds and/or during changes of direction, the closed-loop motor torque commands may suffer from undesirably long response times or undesirable attitude errors.

Still referring to FIG. 3, when the rotor rotational speed is below the threshold rotational speed value, the control process 300 determines a rotor phase error for the reaction wheel and determines a modified motor torque command for the reaction wheel based on the rotor phase error (task 310, 312). As described above in the context of FIG. 2, when the magnitude of the rotor angular velocity is below the threshold value (e.g., less 0.5 radians per second), the motor torque command selection arrangement 220 provides modified motor torque commands to the electric motor 232 of the reaction wheel 230 from the nonlinear motor torque command generation block 218, wherein the modified motor torque commands provided and/or generated by the nonlinear motor torque command generation block 218 are nonlinearly related to the phase error and/or angular position of the rotor 234 and intended to maintain the rotor position in phase lock with the expected rotor position by accounting for the friction forces in the bearings of the reaction wheel 230. The incremental rotor rate conversion block 210 determines the expected incremental rate for the output pulses of the tachometer 240 based on the expected rotor angular velocity from the output of the torque integration block 202, and the incremental rotor rate observation block 212 determines the measured incremental rotational rate based on the output pulses generated by the tachometer 240 over a control cycle. The summation block 214 determines the incremental rate error based on the difference between the expected incremental rotational rate and the measured incremental rotational rate, and the phase error integration block 216 integrates the incremental rate error to obtain a phase error representative of the angular position between an expected rotor position and the measured rotor position expressed in terms of a number of tachometer output pulses (or tachometer rotational increments). Based on the rotor phase error from phase error integration block 216, the nonlinear motor torque command generation block 218 determines a modified motor torque command to be provided to the motor torque command selection arrangement 220 and/or electric motor 232 that reduces the likelihood of frictional forces in the reaction wheel bearings undesirably stopping rotation of the rotor 234, as described above in the context of FIG. 2 and described in greater detail below in the context of FIG. 4. The modified motor torque commands are provided to the electric motor 232 via the motor torque command selection arrangement 220, wherein the electric motor 232 applies the appropriate torque to the rotor 234 to adjust the rotor position (task 308). The loop defined by tasks 302, 304, 310, 312 and 308 may repeat as desired throughout operation of the control system 100 until the rotational speed of the particular reaction wheel in the reaction wheel array 110 increases above the threshold value.

FIG. 4 depicts the magnitude of the modified motor torque commands that are determined by the nonlinear motor torque command generation block 218 and applied to the rotor 234 by the electric motor 232 when the rotor rotational speed is below the threshold rotational speed value for one exemplary embodiment of reaction wheel control system 200. As illustrated by FIG. 4, and with reference to FIGS. 1-3, from an initial time ($t_0$) to a subsequent time ($t_1$), while the rotor phase error is indicative of the measured rotor position being behind the expected rotor position by less than one tachometer increment (or tachometer output pulse) (e.g., $0<p_{err}<1$), the reaction wheel control system 200 provides an acceleration motor torque command that is greater than the likely maximum running torque for the reaction wheel 230 to the electric motor 232. As described above, in an exemplary embodiment, the reaction wheel control system 200 and/or nonlinear motor torque command generation block 218 provides an acceleration motor torque command having a magnitude equal to twice the nominal running torque ($2T_R$) when the rotor phase error is indicative of the rotor 234 being behind the expected rotor position. At time ($t_1$), when the rotor phase error is indicative of the measured rotor position being ahead of the expected rotor position by less than one full tachometer increment (e.g., $-1<p_{err}<0$), the reaction wheel control system 200 provides a deceleration motor torque command that is less than the likely minimum running torque to the electric motor 232. While the measured rotor position is less than one tachometer increment ahead of the expected rotor position, the reaction wheel control system 200 provides a deceleration motor torque command that is less than the running torque until a subsequent time ($t_2$) when the rotor phase error is indicative of the rotor 234 being ahead of the expected rotor position, at which point the reaction wheel control system 200 resumes providing modified motor torque commands greater than the running torque. As described above, in an exemplary embodiment, the reaction wheel control system 200 and/or nonlinear motor torque command generation block 218 provides a deceleration motor torque command having a magnitude equal to half the nominal running torque ($T_R/2$) when the rotor phase error is indicative of the rotor 234 being ahead of the expected rotor position by less than one tachometer increment. As long as torque caused by kinetic friction in the bearings of the reaction wheel 230 falls between these two commands (e.g., between twice the nominal running torque and half the nominal running torque) the reaction wheel control system 200 alternates between providing acceleration motor torque commands and deceleration motor torque commands based on the phase error to maintain the rotor 234 in phase lock with the expected rotor position, as illustrated in FIG. 4.

As the magnitude of the rotational speed of the rotor 234 decreases toward zero and/or reaches zero, the breakaway stiction torque in the bearings of the reaction wheel 230 may exceed the acceleration motor torque command, thereby causing the position of the rotor 234 to fall behind the expected rotor position. When the phase error is indicative of the rotor 234 of the reaction wheel 230 being behind the expected rotor position by at least one tachometer increment but less than two tachometer increments at a subsequent time ($t_3$), the reaction wheel control system 200 provides a stiction-overcoming motor torque command waveform having an instantaneous peak value ($T_S$) that exceeds the maximum torque expected to be caused by stiction forces in the bearings of the reaction wheel 230 (e.g., the maximum breakaway torque). As illustrated, in an exemplary embodiment, the reaction wheel control system 200 and/or nonlinear motor torque command generation block 218 provides a stiction-overcoming motor torque command that increases substantially sinusoidally from the preceding torque command value ($2T_R$) to the instantaneous peak value ($T_S$) that exceeds the stiction torque before decreasing substantially sinusoidally from the peak value ($T_S$) to a torque that exceeds the likely maximum running torque. As noted above, depending on the embodiment, the instantaneous peak value may range from about ten to fifty times the nominal running torque (e.g., $10T_R < T_S < 50T_R$). As described above, in an exemplary embodiment, the reaction wheel control system 200 and/or nonlinear motor torque command generation block 218 is configured to wait for a delay interval ($t_d$) that is chosen based on the rotor phase error before applying another stiction-overcoming motor torque command to allow for the possibility of the rotor 234 returning to being in phase lock with the expected rotor position without an additional stiction-overcoming motor torque command. As illustrated, if at some subsequent time ($t_4$), which is at least the delay interval time ($t_d$) after the time ($t_3$) of the preceding stiction-overcoming motor torque command, the rotor phase error indicates the rotor 234 of the reaction wheel 230 is still behind the expected rotor position by one to two tachometer increments, the reaction wheel control system 200 and/or nonlinear motor torque command generation block 218 provides another stiction-overcoming motor torque command to the electric motor 232. As illustrated, the stiction-overcoming motor torque command may overcome frictional forces in the bearings to accelerate or otherwise rotate the rotor 234, such that rotor position returns to being in phase lock with the expected rotor position, and at some subsequent time ($t_5$) the measured rotor position returns to being ahead of the expected rotor position. When the rotor phase error indicates the rotor 234 is ahead of the expected rotor position, the reaction wheel control system 200 provides a deceleration motor torque command that is less than the likely minimum running torque to the electric motor 232 until the rotor 234 is in phase lock with the expected rotor position, as described above.

Figure 5:
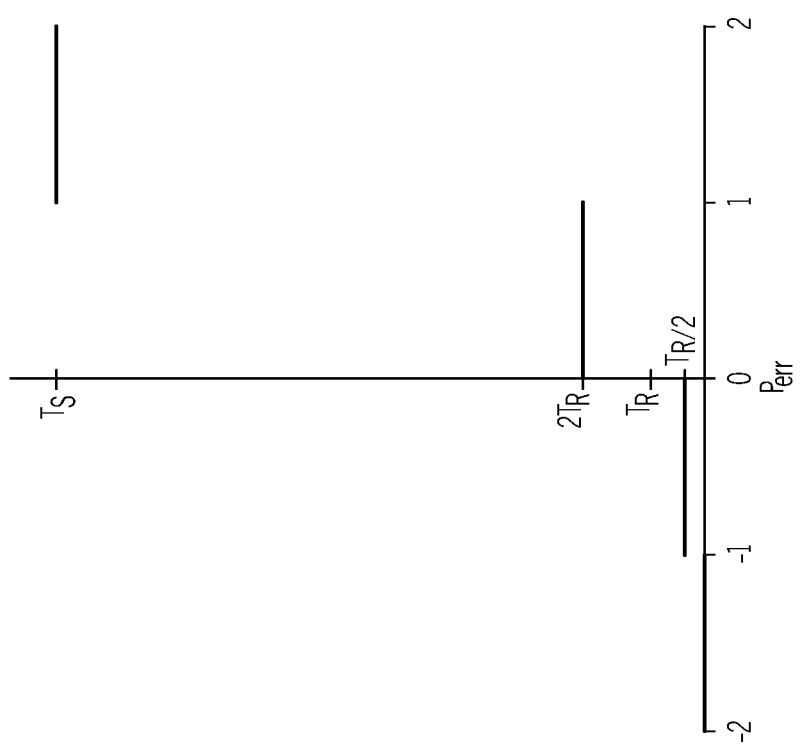
FIG. 5 is a graph illustrating the instantaneous peak magnitude of the modified motor torque commands with respect to phase error in accordance with one exemplary embodiment.

FIG. 5 illustrates the instantaneous peak magnitude of the modified motor torque commands with respect to the phase error ($p_{err}$) for an exemplary embodiment of the reaction wheel control system 200. As illustrated in FIG. 5 and described above in the context of FIGS. 2-4, the magnitude of the modified motor torque commands are nonlinearly related to the amount of phase error. In other words, an increase and/or decrease in the phase error produces a disproportionate change in the instantaneous peak magnitude of the resulting modified motor torque command. It should be noted that although not illustrated in FIG. 5, when the phase error increases and indicates the rotor 234 of the reaction wheel 230 is behind the expected rotor position by at least two tachometer increments (e.g., $p_{err}>2$), the subsequently generated stiction-overcoming motor torque command waveform may have an instantaneous peak magnitude that exceeds that of the stiction-overcoming motor torque command when the rotor 234 of the reaction wheel 230 is behind the expected rotor position by less than two tachometer increments. For example, when the rotor 234 of the reaction wheel 230 is behind the expected rotor position by at least two tachometer increments (e.g., $p_{err}>2$), the resulting stiction-overcoming motor torque command waveform ($T_{S2}$) may have an instantaneous peak magnitude that is some multiple (n) of the peak magnitude of the stiction-overcoming motor torque command when the rotor 234 of the reaction wheel 230 is behind the expected rotor position by more than one but less than two tachometer increments (e.g., $T_{S2}=n \times T_S$) to ensure that the rotor 234 rotates and returns to being in phase lock with the expected rotor position within a reduce amount of time.

One advantage of the systems and/or methods described above is that by applying modified motor torque commands that are nonlinearly related to the rotor phase error at low rotational speeds, the effects of stiction can be mitigated, thereby reducing attitude errors. As described above, the duration of time during which the rotor of a reaction wheel being unintentionally stopped is reduced, and in some embodiments, the stiction-overcoming motor torque commands may result in the rotor resuming rotation and reaching its desired rotor position and/or angular velocity within as few as one control cycle. As compared to the closed-loop motor torque commands that are linearly related to the rotor velocity error described above, the phase-locked loop motor torque commands have a reduced response time when the rotation of the rotor is stopped and/or changes direction.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by control module 108 and/or MCS 104), facilitate generation of motor torque commands for operating a reaction wheel in accordance with the control process 200 described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

For the sake of brevity, conventional techniques related to attitude control systems, reaction wheel controls, slew planning, satellite and/or spacecraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method executable by a control module to control an attitude of a vehicle using a reaction wheel onboard the vehicle, the method comprising:
   receiving a torque command for adjusting the attitude of the vehicle using the reaction wheel;
   determining a phase error of the reaction wheel based at least in part on the torque command, wherein the phase error is indicative of an angular displacement between an angular position of a rotor of the reaction wheel and an expected position of the rotor based on the torque command;
   determining a motor torque command for the reaction wheel based on the phase error, wherein a relationship between a magnitude of the motor torque command and a magnitude of the phase error is nonlinear; and
   providing the motor torque command to the reaction wheel.

2. The method of claim 1, wherein determining the motor torque command comprises determining a stiction-overcoming motor torque command when the phase error is indicative of the rotor being behind an expected rotor position by at least a first amount.

3. The method of claim 2, wherein determining the motor torque command further comprises:
   determining a deceleration motor torque command when the phase error is indicative of the rotor being ahead of the expected rotor position; and
   determining an acceleration motor torque command when the phase error is indicative of the rotor being behind the expected rotor position by less than the first amount.

4. The method of claim 3, wherein:
   the deceleration motor torque command has a magnitude that is a fraction of a magnitude of a nominal running torque for the reaction wheel; and
   the acceleration motor torque command has a magnitude that is a multiple of the magnitude of the nominal running torque.

5. The method of claim 1, wherein determining the motor torque command comprises:
   determining a deceleration motor torque command when the phase error is indicative of a position of the rotor being ahead of an expected rotor position;
   determining a stiction-overcoming motor torque command when the phase error is indicative of the position of the rotor being behind the expected rotor position by at least one rotational increment; and
   determining an acceleration motor torque command when the phase error is indicative of the position of the rotor being behind the expected rotor position by less than one rotational increment.

6. The method of claim 1, further comprising obtaining a rotational speed of the rotor of the reaction wheel, wherein determining the phase error of the reaction wheel comprises:
   determining an expected rotational speed of the rotor based on the torque command; and
   determining the phase error based on a difference between the rotational speed of the rotor and the expected rotational speed.

7. The method of claim 6, the rotor having a rotation sensing element coupled thereto to generate an output pulse each time the rotor rotates by a rotational increment, wherein:
   obtaining the rotational speed of the rotor comprises determining a measured incremental rotational rate for the rotor based on a number of output pulses generated by the rotation sensing element during an observation time interval;
   determining the expected rotational speed of the rotor comprises:
      determining an expected angular velocity of the rotor based on the torque command; and
      multiplying the expected angular velocity by an inverse of the rotational increment to obtain an expected incremental rotational rate for the rotor; and
   determining the phase error comprises integrating a difference between the expected incremental rotational rate and the measured incremental rotational rate.

8. The method of claim 7, wherein determining the motor torque command comprises:
   determining a deceleration motor torque command when the phase error is indicative of the rotor being ahead of an expected rotor position; and
   determining a stiction-overcoming motor torque command when the phase error is indicative of the rotor being one or more rotational increments behind the expected rotor position.

9. The method of claim 1, further comprising:
   determining an expected angular velocity for the rotor of the reaction wheel based on the torque command;
   determining an expected incremental rotational rate for the rotor based on the expected angular velocity;
   determining an incremental rate error based on a difference between the expected incremental rotational rate and a measured incremental rotational rate of the rotor; and
   determining the phase error based on the incremental rate error.

10. The method of claim 1, further comprising obtaining a rotational speed of the rotor of the reaction wheel, wherein determining the motor torque command comprises:
    determining an expected angular velocity for the rotor of the reaction wheel based on the torque command;

determining the phase error based at least in part on the expected angular velocity;

determining the motor torque command based on the phase error when the rotational speed is less than a threshold amount; and determining the motor torque command based on a difference between the expected angular velocity for the rotor and a measured angular velocity for the rotor when the rotational speed is greater than the threshold amount, wherein a magnitude of the motor torque command is linearly related to the difference between the expected angular velocity and the measured angular velocity.

11. The method of claim 1, wherein providing the motor torque command to the reaction wheel comprises providing the motor torque command to the reaction wheel in response to detecting an angular velocity of the rotor is less than a threshold rotational speed.

12. A computer-readable medium having computer-executable instructions or data stored thereon that, when executed by the control module, cause the control module to perform the method of claim 1.

13. A control system for a vehicle, the control system comprising:
a reaction wheel onboard the vehicle, the reaction wheel comprising a rotor coupled to an electric motor;
a rotation sensing element coupled to the rotor, the rotation sensing element generating an output indicative of rotation of the rotor; and
a control module coupled to the electric motor and the rotation sensing element to:
determine a phase error of the rotor, wherein the phase error is indicative of an angular displacement between an angular position of a rotor of the reaction wheel and an expected position of the rotor based on the output of the rotation sensing element and a torque command for the reaction wheel;
determine a motor torque command based on the phase error, wherein a relationship between a magnitude of the motor torque command and the phase error is nonlinear; and
provide the motor torque command to the electric motor, wherein the electric motor applies torque corresponding to the motor torque command to the rotor.

14. The control system of claim 13, wherein the control module is configured to determine the motor torque command by:
determining a deceleration motor torque command having a magnitude less than a running torque for the reaction wheel when the phase error is indicative of the rotor being ahead of an expected rotor position;
determining a stiction-overcoming motor torque command having an instantaneous magnitude greater than or equal to a stiction torque for the reaction wheel when the phase error is indicative of the rotor being behind the expected rotor position by at least a first amount; and
determining an acceleration motor torque command having a magnitude greater than the running torque when the phase error is indicative of the rotor being behind the expected rotor position by less than the first amount.

15. The control system of claim 14, wherein:
the rotor is mounted to the vehicle using one or more bearings;
the running torque corresponds to a torque attributable to kinetic friction in the one or more bearings; and
the stiction torque corresponds to a torque attributable to static friction in the one or more bearings.

16. The control system of claim 13, wherein:
the output generated by the rotation sensing element is indicative of the rotor rotating by a rotational increment; and
the control module is configured to determine the motor torque command by:
determining a deceleration motor torque command having a magnitude less than a running torque for the reaction wheel when the phase error is indicative of the rotor being ahead of an expected rotor position; and
determining a stiction-overcoming motor torque command having an instantaneous magnitude greater than or equal to a stiction torque for the reaction wheel when the phase error is indicative of the rotor being ahead of the expected rotor position by at least one rotational increment.

17. A method executable by a control module to control an attitude of a vehicle using a reaction wheel onboard the vehicle, the reaction wheel having a rotor, the method comprising:
receiving a torque command for adjusting the attitude of the vehicle using the reaction wheel;
determining a phase error of the reaction wheel based at least in part on the torque command;
determining a motor torque command for the reaction wheel based on the phase error, wherein a relationship between a magnitude of the motor torque command and a magnitude of the phase error is nonlinear, wherein determining the motor torque command based on the phase error comprises:
determining a deceleration motor torque command having a magnitude that is less than a running torque of the reaction wheel when the phase error indicates the rotor is ahead of an expected rotor position; and
determining an acceleration motor torque command having a magnitude that is greater than the running torque of the reaction wheel when the phase error indicates the rotor behind the expected rotor position by less than a threshold amount; and
providing the motor torque command to the reaction wheel.

18. The method of claim 17, wherein determining the acceleration motor torque command further comprises determining a stiction-overcoming motor torque command when the phase error indicates the rotor is behind the expected rotor position by more than the threshold amount.

19. A method executable by a control module to control an attitude of a vehicle using a reaction wheel onboard the vehicle, the method comprising:
receiving a torque command for adjusting the attitude of the vehicle using the reaction wheel;
determining a phase error of the reaction wheel based at least in part on the torque command;
determining a motor torque command for the reaction wheel based on the phase error, wherein a relationship between a magnitude of the motor torque command and a magnitude of the phase error is nonlinear, wherein determining the motor torque command comprises:
determining a deceleration motor torque command when the phase error is indicative of the rotor being ahead of an expected rotor position, the deceleration motor torque command having a magnitude that is less than a running torque for the reaction wheel;
determining an acceleration motor torque command when the phase error is indicative of the rotor being behind the expected rotor position by less than a first amount, the acceleration motor torque command having a magnitude that is greater than or equal to the running torque for the reaction wheel; and determining a stiction-overcoming motor torque command when the phase error is indicative of the rotor being behind the expected rotor position by at least the first amount, the stiction-overcoming motor torque command having an instantaneous magnitude greater than or equal to a stiction torque for the reaction wheel; and providing the motor torque command to the reaction wheel.

* * * * *